(12) United States Patent
Fujinaga et al.

(10) Patent No.: US 8,605,196 B2
(45) Date of Patent: Dec. 10, 2013

(54) LENS MODULE, IMAGING APPARATUS, ELECTRONIC SYSTEM, AND METHOD FOR DRIVING LENS MODULE

(75) Inventors: Yoichiro Fujinaga, Kanagawa (JP); Yoshiteru Kamatani, Kanagawa (JP); Yoshihito Higashitsutsumi, Kanagawa (JP); Junichi Muramoto, Tokyo (JP); Shuji Shimizu, Kanagawa (JP)

(73) Assignee: Sony Corporation (JP)

( * ) Notice: Subject to any disclaimer, the term of this patent is extended or adjusted under 35 U.S.C. 154(b) by 51 days.

(21) Appl. No.: 13/460,888

(22) Filed: May 1, 2012

(65) Prior Publication Data
US 2012/0287318 A1 Nov. 15, 2012

(30) Foreign Application Priority Data
May 11, 2011 (JP) ................................ 2011-106311

(51) Int. Cl.
| | | |
|---|---|---|
| H04N 5/225 | (2006.01) | |
| H04N 3/14 | (2006.01) | |
| H04N 5/335 | (2011.01) | |
| G02B 13/16 | (2006.01) | |
| G02B 7/02 | (2006.01) | |
| H01L 27/00 | (2006.01) | |

(52) U.S. Cl.
USPC ........... 348/340; 348/335; 348/373; 348/374; 348/294; 250/208.1; 359/811

(58) Field of Classification Search
USPC ........................ 348/294, 335, 340, 373, 374; 250/208.1, 239; 257/432–434, 680; 359/811, 819, 823, 824; 396/55, 133, 396/144, 529, 535; 439/607.01–607.59
See application file for complete search history.

(56) References Cited

U.S. PATENT DOCUMENTS

| | | | |
|---|---|---|---|
| 7,205,540 B2 * | 4/2007 | Nakasuji et al. | 250/310 |
| 7,558,168 B2 * | 7/2009 | Chen | 369/44.32 |
| 7,804,645 B2 * | 9/2010 | Morita et al. | 359/554 |
| 7,817,360 B2 * | 10/2010 | Chang | 359/824 |
| 2006/0054819 A1 * | 3/2006 | Nakasuji et al. | 250/310 |
| 2006/0130087 A1 * | 6/2006 | Chen | 720/681 |
| 2009/0225453 A1 * | 9/2009 | Chang | 359/824 |
| 2011/0008034 A1 * | 1/2011 | Kamatani et al. | 396/133 |
| 2011/0013289 A1 * | 1/2011 | Kamatani et al. | 359/698 |
| 2012/0050898 A1 * | 3/2012 | Nagai et al. | 359/824 |
| 2012/0061583 A1 * | 3/2012 | Wieland et al. | 250/396 R |
| 2012/0249868 A1 * | 10/2012 | Kamatani et al. | 348/374 |

FOREIGN PATENT DOCUMENTS

| | | |
|---|---|---|
| JP | 2006-172635 | 6/2006 |
| JP | 2006-293006 | 10/2006 |

* cited by examiner

*Primary Examiner* — Chia-Wei A Chen
(74) *Attorney, Agent, or Firm* — Sheridan Ross P.C.

(57) ABSTRACT

A compact and thin lens module that uses a flat-plate-shaped displacement device to drive a lens, and a compact, thin imaging apparatus and electronic system using the lens module.

9 Claims, 10 Drawing Sheets

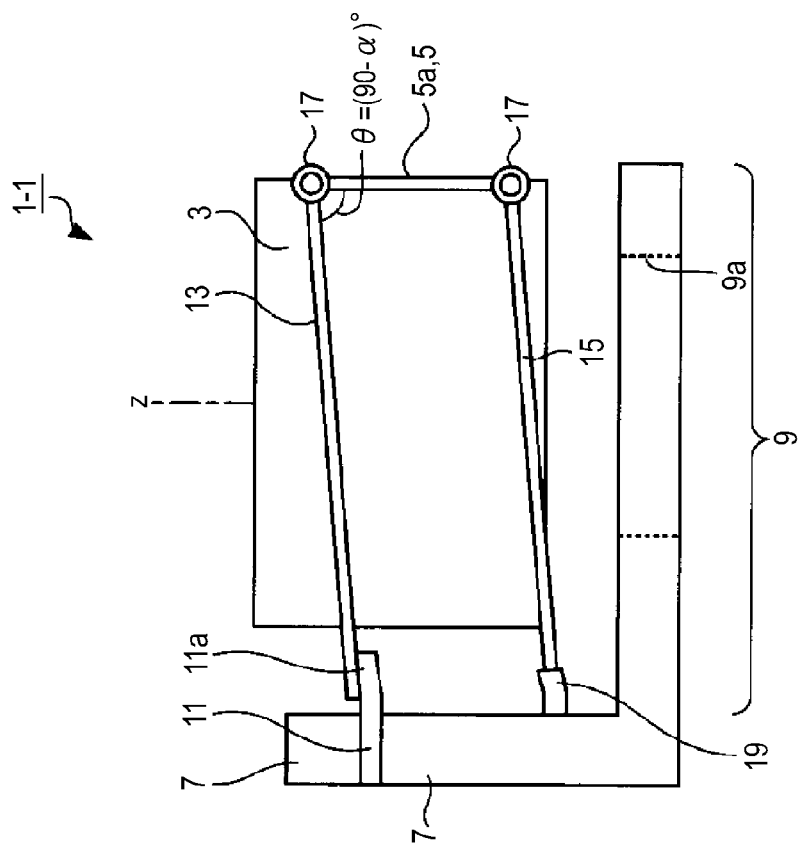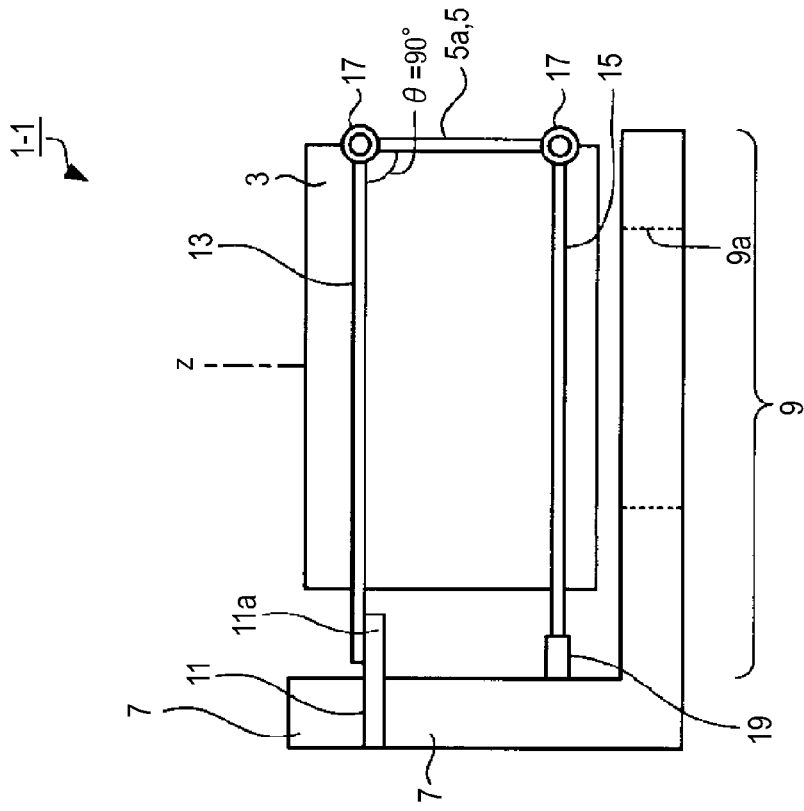

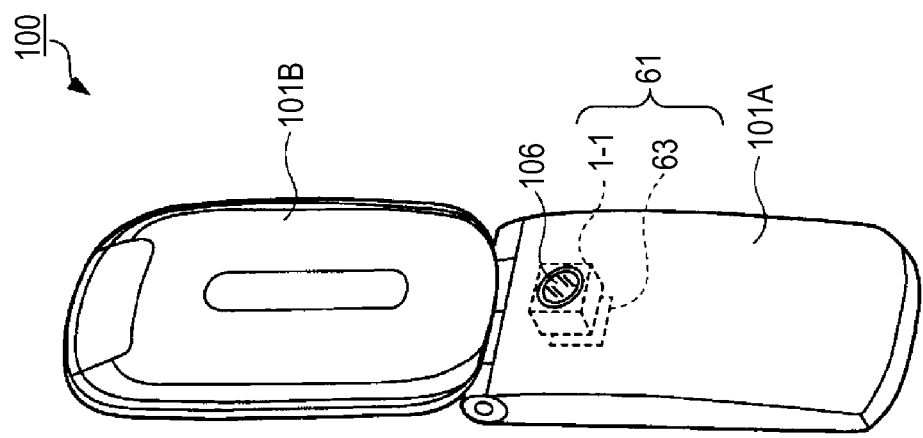
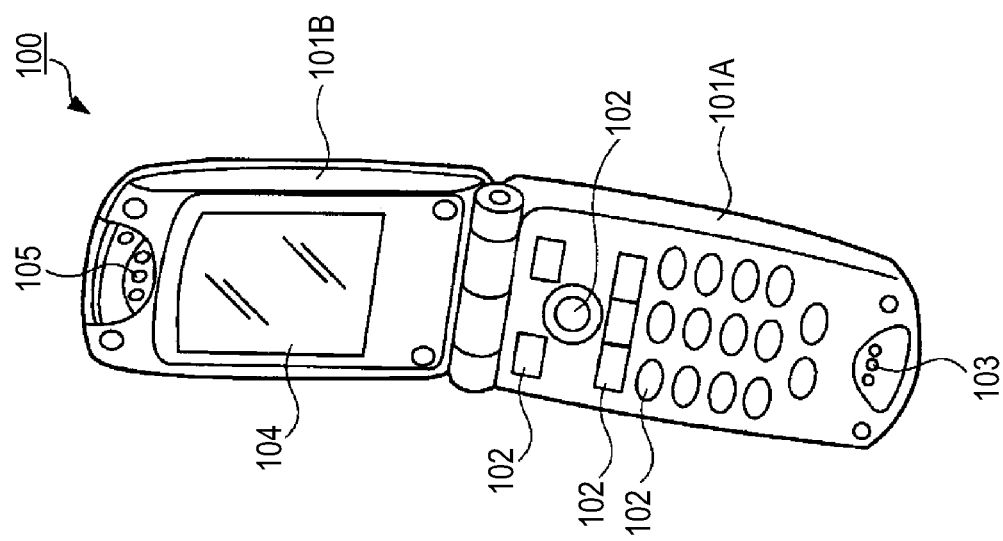

LENS MODULE, IMAGING APPARATUS, ELECTRONIC SYSTEM, AND METHOD FOR DRIVING LENS MODULE

FIELD

The present technology relates to a lens module including a lens moved by using a flat-plate-shaped displacement device that deforms when a voltage is applied thereto, an imaging apparatus and an electronic system using the lens module, and a method for driving the lens module.

BACKGROUND

In recent years, mobile phones, personal computers (PCs), PDAs (personal digital assistants), and other mobile electronic systems have significantly progressed in terms of multi-functionality and are typically provided with a lens module that provides them with imaging capability. In a mobile electronic system of this type, it is necessary to move a lens toward a subject or move the lens away therefrom along the optical axis so as to provide a camera module with auto-focus capability.

A lens in a lens module has been typically moved by using a voice coil motor, a stepper motor, or any other driver in related art. In recent years, however, a driver using a polymer actuator device has been developed from the viewpoint of compactness. A polymer actuator device is formed, for example, of an ion exchange resin film sandwiched by a pair of electrodes, and the ion exchange resin film is displaced in the direction perpendicular to the film plane when a potential difference is produced between the pair of electrodes.

An example of a lens module using a polymer actuator device of this type has, for example, a configuration in which a movable lens frame that holds a group of lenses is supported by a guide shaft movably along the optical axis and a polymer actuator device is so positioned that it is aligned with the movable lens frame along the optical axis. According to the configuration described above, the movable lens frame is moved along the optical axis when the polymer actuator device is deformed (see JP-A-2006-293006, for example).

In another configuration of a lens module of this type, a set of polymer actuator devices that curve in directions different from each other are combined with each other, and a lens is disposed at one end of the polymer actuator device assembly (see JP-A-2006-172635, for example).

SUMMARY

In the lens module shown in JP-A-2006-293006, however, since the polymer actuator device is so positioned that it is aligned with the movable lens frame, which holds a group of lenses, along the optical axis direction, it is difficult to reduce the thickness of the lens module and an electronic system using the lens module.

In the lens module shown in JP-A-2006-172635, since a lens is disposed at an end of the polymer actuator device assembly, each of the polymer actuator devices needs to be long enough to move the lens over a wide range. The long length prevents the lens module and an electronic system using the lens module from being compact.

It is therefore desirable to provide a lens module that can be compact and thin and has a configuration using a flat-plate-shaped displacement device to drive a lens, and a compact, thin imaging apparatus and electronic system using the lens module.

An embodiment of the present technology is directed to a lens module including a lens body, a lens holding member that holds the lens body by holding a sidewall thereof extending along an optical axis, and a fixing member disposed on the opposite side of the lens body to the lens holding member. Further, flat-plate-shaped displacement devices are disposed on opposite sides of the sidewall of the lens body, each of the displacement devices having one end fixed to the fixing member and the other end being a free end and protruding toward the lens holding member. Each of the displacement devices is curved along surfaces thereof when a voltage is applied thereto to cause the free end to be displaced along the optical axis. Moreover, a plurality of drive support members are disposed on opposite sides of the sidewall of the lens body, each of the drive support members having one end fixed to the free end of the corresponding displacement device and the other end pivotally fixed to the lens holding member.

According to the thus configured lens module, the displacement of the free ends of the displacement devices causes the drive support members having ends on one side fixed to the free ends to pivot, which displaces the lens holding member fixed to ends of the drive support members on the other side in such a way that the lens holding member remains parallel to the fixing member, whereby the lens body held by the lens holding member is moved along the optical axis. The thus configured lens module allows the lens body to be moved along the optical axis with no tilt of the lens body without employing a configuration in which displacement devices are stacked along the optical axis of the lens body or the lens body is held at ends of the displacement devices.

Another embodiment of the present technology is also directed to an imaging apparatus and an electronic system using the lens module described above and a method for driving the lens module.

The embodiments of the present technology described above allow a lens body to be moved along the optical axis without employing a configuration in which displacement devices are stacked along the optical axis of the lens body or the lens body is held at ends of the displacement devices. A lens module, and an imaging apparatus and an electronic system using the lens module can be thin and compact.

BRIEF DESCRIPTION OF THE DRAWINGS

FIGS. 2A and 2B are side views for describing the configuration of the lens module according to the first embodiment and drive operation thereof;

FIGS. 11A and 11B are configuration diagrams of an electronic system according to a sixth embodiment.

DETAILED DESCRIPTION

Embodiments of the present technology will be described below with reference to the drawings in the following order.
1. First embodiment (Lens module)
2. Second embodiment (Lens module including shaped displacement device)
3. Third embodiment (Lens module using elastic wire)
4. Fourth embodiment (Lens module including lens body having cubic shape)
5. Fifth embodiment (Imaging apparatus)
6. Sixth embodiment (Electronic system)

1. First Embodiment

Lens Module

Figure 1:
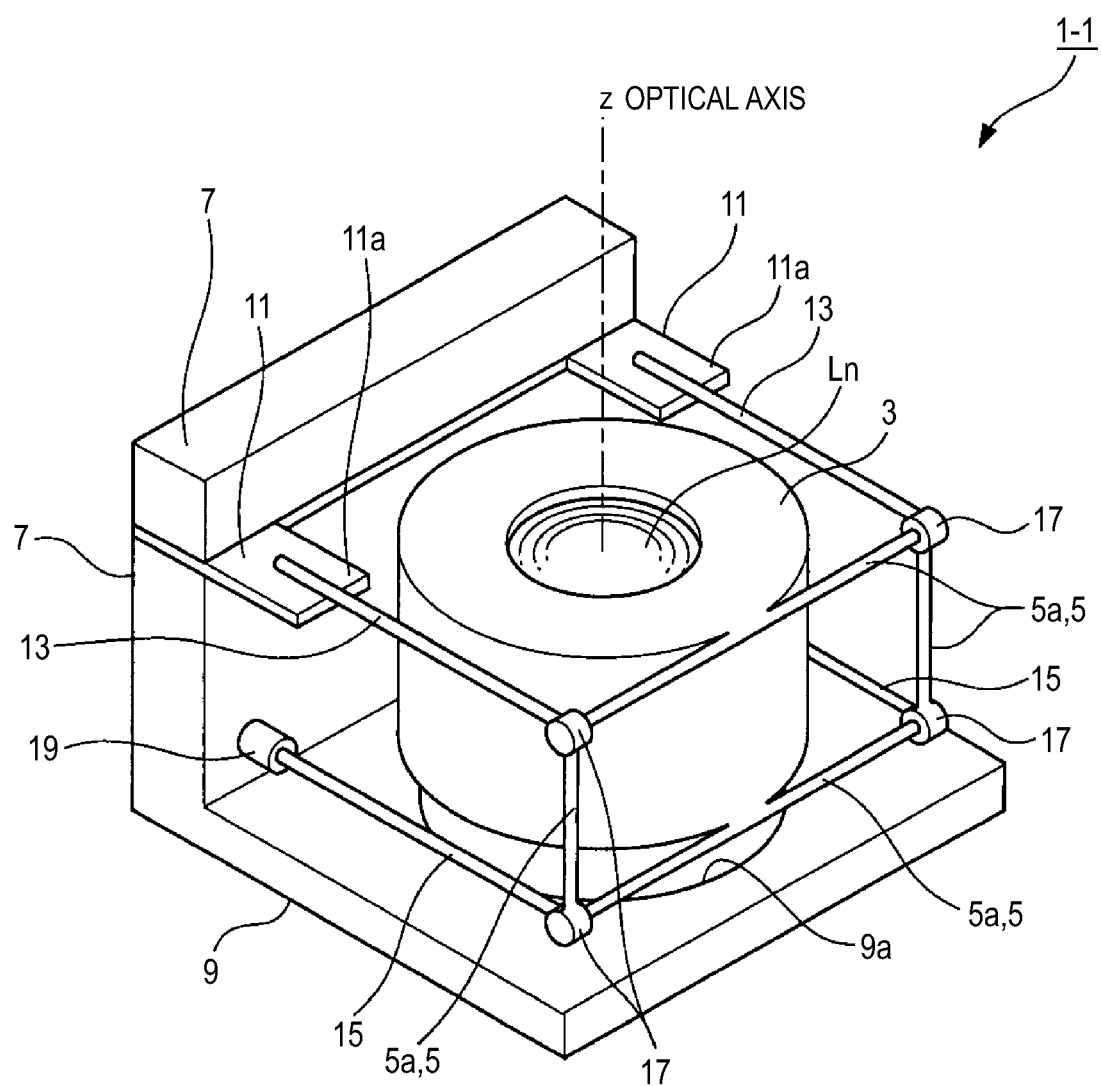
FIG. 1 is a perspective view for describing the configuration of a lens module according to a first embodiment.

FIG. 1 is a perspective view for describing the configuration of a lens module according to a first embodiment. FIGS. 2A and 2B are side views for describing the configuration of the lens module according to the first embodiment and drive operation thereof. The configuration of the lens module according to the first embodiment and the driving operation thereof will be described below with reference to FIGS. 1, 2A, and 2B.

[Configuration of Lens Module According to First Embodiment]

A lens module 1-1 shown in FIGS. 1, 2A, and 2B is incorporated, for example, in an imaging apparatus and an optical pickup apparatus and moves a lens Ln along an optical axis z with no inclination thereof.

The lens module 1-1 includes a lens body 3 formed of the lens Ln and a lens holding member 5 that holds the lens body 3 specifically by holding a sidewall thereof parallel to the optical axis z. A fixing member 7 is provided on the opposite side of the lens body 3 to the lens holding member 5, and a base 9 extends from an end of the fixing member 7 toward the lens body 3 and overlaps with the lens body 3. Further, displacement devices 11 are so provided that they extend from the fixing member 7 toward the lens holding member 5, and drive support members 13 that connect the displacement devices 11 to the lens holding member 5 are provided. Moreover, support members 15 are so provided that they run between the lens holding member 5 and the fixing member 7 in parallel to the drive support members 13. Each of the above components will be sequentially described below in detail.

<Lens Body 3>

The lens body 3 is formed of an objective lens for an imaging apparatus or an optical pickup apparatus. The lens body 3 may be a combination of a plurality of lenses Ln integrated along the optical axis z into a barrel-shaped member or may be a single lens Ln. In the present embodiment, the lens body 3 has a tubular barrel-like shape that follows the outer shape of each lens Ln. The lens body 3 may have a diameter that changes along the optical axis z in accordance with the diameter of each lens Ln disposed along the optical axis z.

<Lens Holding Member 5>

The lens holding member 5 holds the lens body 3 specifically by holding the sidewall thereof extending along the optical axis z. The lens holding member 5 is formed, for example, by connecting four wires 5a into a rectangular frame or bending a single wire into a rectangular frame. The wire 5a, which forms the lens holding member 5, is rigid enough not to flex. The lens body 3 is fixed to the lens holding member 5, specifically, central portions of the wires 5a disposed perpendicular to the optical axis z in two rows. A method for fixing the lens body 3 to the lens holding member 5 is selected as appropriate in accordance with the materials of the two members. The lens holding member 5 is not necessarily configured as described above and may be configured in any way in which the lens holding member 5 can hold the lens body 3 specifically by holding the sidewall thereof extending along the optical axis z. The lens holding member 5 may, for example, have a plate-like shape or include an arm-shaped portion extending around and surrounding the side surface of the lens body 3.

<Fixing Member 7>

The fixing member 7 fixes the lens module 1-1 in a housing of an imaging apparatus or an optical pickup apparatus and is located on the opposite side of the lens body 3 to the lens holding member 5. The fixing member 7 is formed, for example, of two fixing portions stacked along the optical axis z, and the displacement devices 11, each of which has a flat plate shape, are sandwiched between the two fixing portions. Portions of the fixing member 7 that sandwich the displacement devices 11 work as terminals through which a voltage is applied to the displacement devices 11.

The displacement devices 11 sandwiched between the fixing portions of the fixing member 7 protrude from the fixing member 7, and corners (edges) of the portions of the fixing member 7 where the displacement devices 11 protrude may be chamfered. The chamfered corners (edges) allow the displacement devices 11, which will be described below, to be readily curved and reduce the amount of scraping and friction otherwise greatly produced at sharp corners of the fixing member 7, whereby the durability of the displacement devices 11 is improved.

<Mount 9>

The mount 9 is a base member (base) for supporting the entire lens module 1-1. The mount 9 extends from one end of the fixing member 7 in the direction perpendicular to the optical axis z of the lens body 3 and is so disposed that the mount 9 overlaps with the lens body 3. The mount 9 has an opening 9a through which light collected by the lens body 3 passes. The mount 9, which extends from the fixing member 7, can be considered as part of the fixing member 7.

<Displacement Device 11>

Each of the displacement devices 11 deforms when a voltage is applied thereto, and the deformation serves as a drive source that moves the lens body 3 held by the lens holding member 5 along the optical axis z with no inclination thereof. Each of the displacement devices 11 is a flat-plate shaped device that curves along the surfaces when a voltage is applied and so disposed that the surfaces that curve, that is, driven surfaces are perpendicular to the optical axis z.

In the present description, the two displacement devices 11 are disposed on opposite sides of the sidewall of the lens body 3, and each of the two displacement devices 11 is so fixed that one end thereof is sandwiched between the two fixing portions of the fixing member 7. Each of the displacement devices 11 has one end that is fixed (referred to as fixed end) and the other end that is a free end 11a, and the free end 11a protrudes toward the lens holding member 5, that is, the lens body 3. When the driven surfaces of each of the two displacement devices 11 are curved by voltage application, the free end 11a, which protrudes from the fixing member 7, is displaced along the optical axis z.

Each of the two displacement devices 11 described above has, for example, a rectangular shape in a plan view and is so fixed that the displacement device 11 does not come into contact with the lens body 3. The two displacement devices 11 may alternatively be so shaped that they are connected to each other in a plan view on the side where the fixing member 7 is present as long as the thus shaped displacement devices 11 do not come into contact with the lens body 3.

Figure 3A:
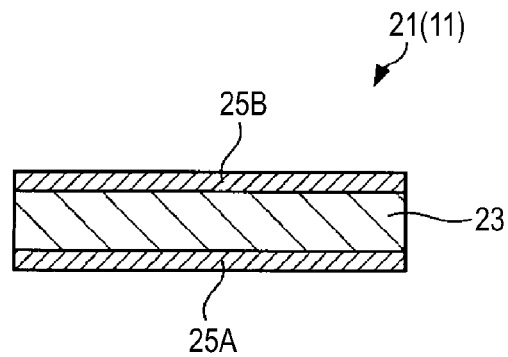
FIGS. 3A and 3B are diagrammatic cross-sectional views for describing an exemplary detailed configuration and basic operation of a polymer actuator device.
Figure 3B:
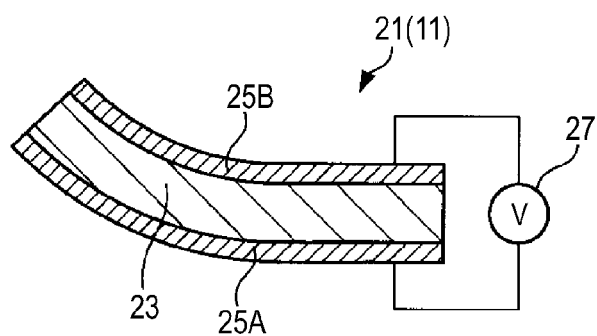

Each of the displacement devices 11 described above is, for example, a polymer actuator device. FIGS. 3A and 3B are diagrammatic cross-sectional views for describing an exemplary detailed configuration and basic operation of a polymer actuator device. A polymer actuator device 21 used as each of the displacement devices (11) has a cross-sectional structure in which a pair of electrode films 25A and 25B are bonded to opposite surfaces of an ion conductive polymer compound film 23, as shown in FIGS. 3A and 3B. In other words, the polymer actuator device 21 has a pair of electrode films 25A and 25B and an ion conductive polymer compound film 23 interposed between the electrode films 25A and 25B. The polymer actuator device 21 and the electrode films 25A and 25B may be entirely covered with an insulating protective film made of a highly elastic material (such as polyurethane). The ion conductive polymer compound film 23 is also called an electro active polymer (EAP) sheet.

The thus configured polymer actuator device 21 operates as follows. A polymer actuator device 21 made of a cation material including a cation and a polarized solvent will first be described.

In this case, the polymer actuator device 21, when no voltage is applied thereto, is not curved but is flat because the cation material is distributed in the ion conductive polymer compound film 23 in a substantially uniform manner, as shown in FIG. 3A. When a voltage application unit 27 is used to apply a voltage as shown in FIG. 3B, the polymer actuator device 21 behaves as follows. That is, when a predetermined drive voltage is, for example, so applied between the electrode films 25A and 25B that the electrode film 25A has a negative potential and the electrode film 25B has a positive potential, the cation solvated with the polarized solvent moves toward the electrode film 25A. In this process, since an anion hardly moves in the ion conductive polymer compound film 23, the ion conductive polymer compound film 23 swells on the side where the electrode film 25A is present and contracts on the side where the electrode film 25B is present. As a result, the polymer actuator device 21 is curved as a whole toward the electrode film 25B. Thereafter, when the potential difference between the electrode films 25A and 25B is removed or no voltage is applied therebetween, the cation material (cation and polarized solvent) shifted toward the electrode film 25A in the ion conductive polymer compound film 23 is diffused, and the polymer actuator device 21 therefore returns to the flat state shown in FIG. 3A. Further, when the no voltage application state shown in FIG. 3A is changed by applying a predetermined drive voltage between the electrode films 25A and 25B in such a way that the electrode film 25A has a positive potential and the electrode film 25B has a negative potential, the cation solvated with the polarized solvent moves toward the electrode film 25B. In this case, since the ion conductive polymer compound film 23 contracts on the side where the electrode film 25A is present and swells on the side where the electrode film 25B is present, the polymer actuator device 21 is curved as a whole toward the electrode film 25A.

A description will next be made of a case where an ionic liquid including a liquid cation is used as the cation material.

In this case, the polymer actuator device 21, when no voltage is applied thereto, is also flat because the ionic liquid is distributed in the ion conductive polymer compound film 23 in a substantially uniform manner, as shown in FIG. 3A. When the voltage application unit 27 is used to apply a voltage as shown in FIG. 3B, the polymer actuator device 21 behaves as follows. For example, a predetermined drive voltage is so applied between the electrode films 25A and 25B that the electrode film 25A has a negative potential and the electrode film 25B has a positive potential. The cation in the ionic liquid moves toward the electrode film 25A, but an anion typically cannot move in the ion conductive polymer compound film 23, which is a cation exchange film. As a result, the ion conductive polymer compound film 23 swells on the side where the electrode film 25A is present and contracts on the side where the electrode film 25B is present. The polymer actuator device 21 is therefore curved as a whole toward the electrode film 25B. Thereafter, when the potential difference between the electrode films 25A and 25B is removed or no voltage is applied therebetween, the cation shifted toward the electrode film 25A in the ion conductive polymer compound film 23 is diffused, and the polymer actuator device 21 therefore returns to the flat state shown in FIG. 3A. Further, when the no voltage application state shown in FIG. 3A is changed by applying a predetermined drive voltage between the electrode films 25A and 25B in such a way that the electrode film 25A has a positive potential and the electrode film 25B has a negative potential, the cation in the ionic liquid moves toward the electrode film 25B. In this case, since the ion conductive polymer compound film 23 contracts on the side where the electrode film 25A is present and swells on the side where the electrode film 25B is present, the polymer actuator device 21 is curved as a whole toward the electrode film 25A.

In the drive operation described above, it is preferable that a voltage higher than or equal to a withstand voltage of the polymer actuator device 21 (about 3V, for example) is not applied between the electrode films 25A and 25B for a long period (about one second, for example). The reason for this is that the driving condition described above allows the durability of the polymer actuator device 21 to be improved. Each of the displacement devices 11 is not limited to the polymer actuator device described above but may be any plate-shaped device that deforms when a voltage is applied thereto. Other examples of the displacement devices 11 may include a device made of a shape memory alloy and a piezoelectric device.

Each of the displacement devices 11, which is formed, for example, of a polymer actuator device, is so configured that a voltage is applied to its fixed end, which is fixed to the fixing member 7, as shown in FIGS. 1, 2A, and 2B described above.

<Drive Support Member 13>

The drive support members 13, each of which is formed, for example, of a rigid, wire-shaped link bar that does not bend, are so provided that they run between the lens holding member 5 and the displacement devices 11 on opposite sides of the sidewall of the lens body 3. Each of the drive support members 13 has one end fixed to the free end 11a of the corresponding displacement device 11 and the other end pivotally fixed to the lens holding member 5. In this state, the two drive support members 13 are kept parallel to each other and flush with each other along the optical axis z.

Figure 4A:
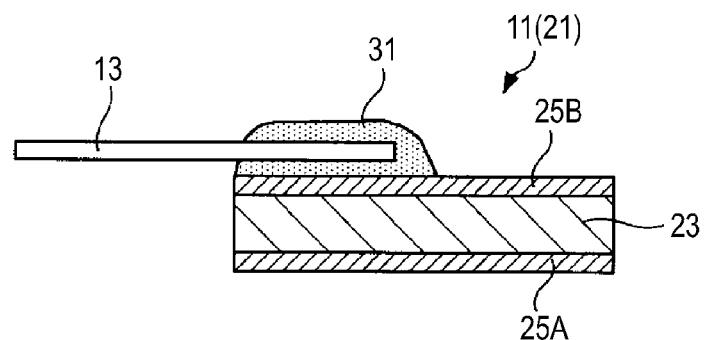
FIGS. 4A and 4B are cross-sectional views for describing the connection between a support member and a displacement device.
Figure 4B:
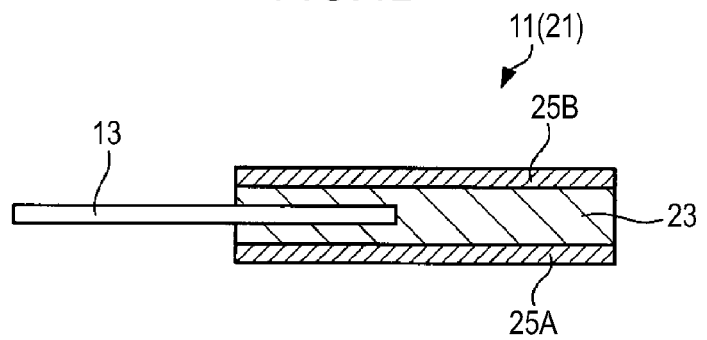

The drive support members 13 are not necessarily fixed to the displacement devices 11 in a specific manner, and what is important is that the drive support members 13 are so fixed to the free ends 11a of the displacement devices 11 that the fixed drive support members 13 do not prevent the displacement devices 11 from being displaced. FIGS. 4A and 4B are cross-sectional views for describing how the drive support members 13 are fixed to the displacement devices 11.

Each of the drive support members 13 may be fixed to the corresponding displacement device 11 with an adhesive 31, as shown in FIG. 4A. When the displacement devices 11 are the polymer actuator devices (21) described above and the drive support members 13 are made of a conductive material, the drive support members 13 are fixed to the displacement devices 11, for example, with an insulating adhesive 31, which provides insulation between the drive support members 13 and the electrode films 25A, 25B of the displacement devices 11.

Alternatively, each of the drive support members 13 may be so fixed to the corresponding displacement device 11 that one end of the drive support member 13 is held in the layer of the displacement device 11, as shown in FIG. 4B. When the displacement devices 11 are the polymer actuator devices (21) described above and the drive support members 13 are made of a conductive material, the drive support members 13 are held in the ion conductive polymer compound films 23 or the surfaces of the drive support members 13 are covered with an insulating coating, which provides insulation between the drive support members 13 and the electrode films 25A, 25B of the displacement devices 11.

Figure 5A:
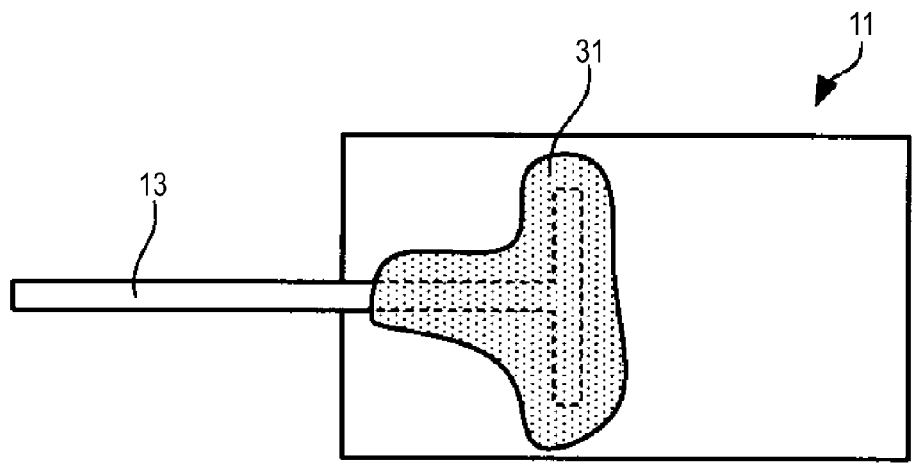
FIG. 5A is a plan view for describing the connection between the support member and the displacement device and FIG. 5B is a cross-sectional view for describing the connection between the support member and the displacement device.
Figure 5B:
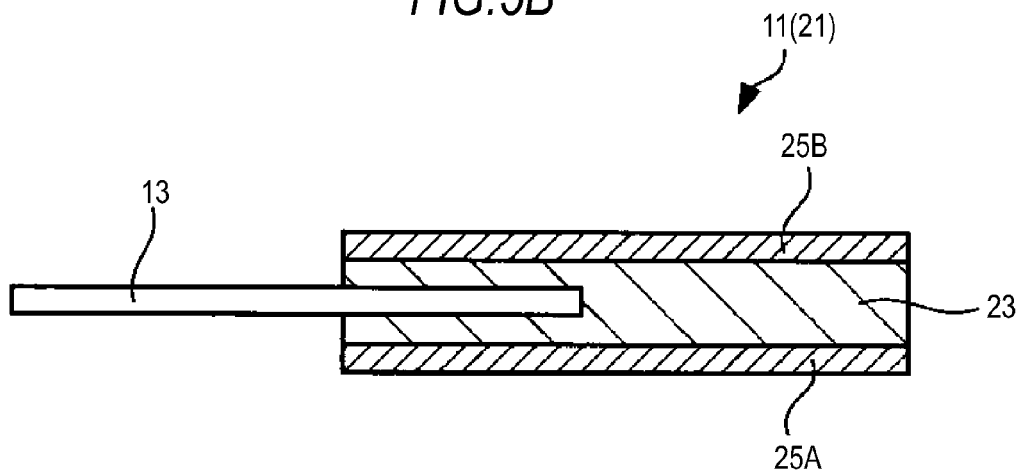

FIG. 5A is a plan view showing a portion where one of the drive support members 13 is fixed to the corresponding displacement device 11. To securely fix the drive support member 13 to the displacement device 11, the end of the drive support member 13 that is fixed to the displacement device 11 may be split in the direction perpendicular to the direction in which the drive support member 13 extends, as shown in FIG. 5A.

On the other hand, connecting members 17 for pivotally fixing the drive support members 13 to the lens holding member 5 are provided at the portions where the drive support members 13 are fixed to the lens holding member 5. The connecting members 17, while holding the drive support members 13 in a stable manner, connect the drive support members 13 in such a way that they pivotally move in planes parallel to the optical axis z when forces act on the drive support members 13. In the present description, it is assumed in a normal state in which no force is applied that the interior angle θ between each of the drive support members 13 and the lens holding member 5 is set at 90°, and that the drive support member 13 is kept inclined to the optical axis z by 90°, as shown in FIG. 2A. Each of the connecting members 17 is, for example, a hinge with a stopper or a coil spring.

<Support Member 15>

The support members 15 are similar to the drive support members 13 described above, and each of the support members 15 is formed, for example, of a rigid, wire-shaped link bar that does not bend. The support members 15 are so disposed that they run between the lens holding member 5 and fixing member 7 on opposite sides of the sidewall of the lens body 3. One of the support members 15, the lens holding member 5, the fixing member 7, and one of the drive support members 13 form a parallel link mechanism along the optical axis z.

The support members 15 are disposed at a height different from that of the drive support members 13 along the optical axis z. Further, each of the support members 15 has one end pivotally fixed to the fixing member 7 and the other end pivotally fixed to the lens holding member 5. In this state, the two support members 15 are kept parallel to each other and flush with each other along the optical axis z.

Connecting members 19 for pivotally fixing the support members 15 to the fixing member 7 are provided at the portions where the support members 15 are fixed to the fixing member 7. The connecting members 19, while holding the support members 15 in a stable manner, connect the support members 15 in such a way that they pivotally move in planes parallel to the optical axis z when forces act on the support members 15. In the present description, it is assumed in a normal state in which no force is applied that the support members 15 are inclined to the direction in which the fixing member 7 extends, that is, the optical axis z by 90°, as shown in FIG. 2A. Each of the connecting members 19 is, for example, an elastic hinge.

On the other hand, connecting members 17 similar to the connecting members 17 for fixing the drive support members 13 to the lens holding member 5 are provided at the portions where the support members 15 are fixed to the lens holding member 5. The support members 15 are thus pivotally fixed to the lens holding member 5.

In the above configuration, the lens holding member 5, the fixing member 7, one of the drive support members 13, and one of the support members 15 form a parallel link mechanism along the optical axis z, as described above. The parallel link mechanism is disposed on both sides of the lens body 3, and the two parallel link mechanisms form what is called a pantograph structure.

[Drive Operation of Lens Module According to First Embodiment]

Drive operation of the lens module 1-1 will next be described. First, when no voltage is applied to the displacement devices 11, the displacement devices 11 are not curved but flat, as shown in FIGS. 1 and 2A. At this point, the interior angle θ of each of the parallel link mechanisms formed of the lens holding member 5, the fixing member 7, the drive support members 13, and the support members 15 is kept at θ=90°, and the lens body 3 held by the lens holding member 5 is kept in an initial position.

On the other hand, when a voltage is so applied to the displacement devices 11 that they are curved in the direction away from the mount 9, the drive support members 13 fixed to the free ends 11a of the displacement devices 11 pivot about the displacement devices 11 in the direction away from the mount 9, as shown in FIG. 2B. The lens holding member 5 fixed to the drive support members 13 are therefore lifted in the direction away from the mount 9. In each of the parallel link mechanisms formed of the lens holding member 5, the fixing member 7, the drive support members 13, and the support members 15, the interior angle θ between the lens holding member 5 and the drive support member 13 changes from 0 to (90−α)°.

The change in the interior angle causes the lens holding member 5 to move along the optical axis z while the lens holding member 5 remains parallel to the fixing member 7 and hence move the lens body 3 held by the lens holding member 5 relative to the fixing member 7 with no inclination of the optical axis z (that is, with no tilt of the optical axis z). In the example shown in FIG. 2B, the lens body 3 moves with no inclination of the optical axis z while being lifted in the direction away from the mount 9.

When the voltage application to the displacement devices 11 is terminated in this state, the displacement devices 11 return from the curved state to the flat state. At this point, the interior angle θ of each of the parallel link mechanisms formed of the lens holding member 5, the fixing member 7, the drive support members 13, and the support members 15 returns to 90°, and hence the lens body 3 returns to the initial position, as shown in FIG. 2A.

In the drive operation described above, the travel of the lens body 3 along the optical axis z depends on the amount of curvature of the displacement devices 11, that is, is controlled by the magnitude of the voltage applied to the displacement devices 11. Further, the direction of the curvature of the displacement devices 11 is controlled by the state of the voltage application to the electrodes that form the displacement devices 11, as described in association with the configuration of the displacement devices 11. For example, to move the lens body 3 toward the mount 9, the state of the voltage application to the electrodes that form the displacement devices 11 may be reversed from the state of the voltage application in the drive operation described above.

To increase the thrust force that moves the lens body 3, the width of the displacement devices 11 in the direction perpendicular to the optical axis z may be increased. Increasing the thrust force produced by the displacement devices 11 as described above also increases the travel of the lens body 3 and the speed at which the lens body 3 is moved. To increase the travel of the lens body 3, the length of the portions of the displacement devices 11 that protrude from the fixing member 7 may alternatively be increased. To increase the speed at which the lens body 3 is moved, the length of the portions of the displacement devices 11 that protrude from the fixing member 7 may alternatively be reduced.

[Advantageous Effects Provided by Lens Module According to First Embodiment]

In the lens module 1-1 according to the first embodiment described above, the displacement of the free ends 11a of the displacement devices 11 fixed to the fixing member 7 produces pivotal motion of the drive support members 13 having ends on one side that are fixed to the free ends 11a. As a result, the lens holding member 5 fixed to the ends of the drive support members 13 on the other side is displaced while the lens holding member 5 remains parallel to the fixing member 7, and hence the lens body 3 held by the lens holding member 5 is moved along the optical axis z. The thus configured lens module 1-1 allows the lens body 3 to be moved along the optical axis z with no tilt thereof without employing a configuration in which the displacement devices 11 are stacked along the optical axis z of the lens body 3 or the lens body 3 is held at ends of the displacement devices 11.

Each of the drive support members 13 so fixed that it runs between the corresponding displacement device 11 and the lens holding member 5 can be formed of a very thin needle, such as a wire. The lens module can therefore be thinner and smaller than a lens module having a configuration in which the displacement devices 11 are stacked along the optical axis z of the lens body 3 or the lens body 3 is held at ends of the displacement devices 11. Further, according to the configuration described above, the difference between the outer diameter of the lens module 1-1 and the diameter of the lens body 3 can be reduced, whereby the outer diameter of the lens module 1-1 can be reduced relative to the aperture diameter of the lens Ln or the diameter of the lens Ln can be increased.

Since the displacement devices 11 only need to have a function of displacing the free ends 11a thereof, each of the displacement devices 11 may have a simple shape, such as a rectangle or a trapezoid. Each of the displacement devices 11 formed, for example, of a polymer actuator device may therefore have a simplified shape in a plan view, which allows the yield (number of products) of EAP sheets (that is, polymer actuator devices) per sheet to be significantly greater than, for example, a case where polymer actuator devices are stacked along the optical axis of the lens body, resulting in cost reduction.

The first embodiment has been described with reference to the configuration in which the drive support members 13 are fixed between the lens holding member 5 and the displacement devices 11 on opposite sides of the lens body 3 and the support members 15 are fixed between the lens holding member 5 and the fixing member 7 also on opposite sides of the lens body 3 at a height different from the height where the drive support members 13 are fixed. The lens module 1-1 according to the first embodiment may alternatively be so configured that four displacement devices 11 are disposed at two different heights on opposite sides of the lens body 3 and the drive support members 13 are fixed between the lens holding member 5 and the four displacement devices 11. The configuration described above doubles the drive force produced by the displacement devices 11. Further, since the four sets of members having the same configuration connect the lens holding member 5 to the fixing member 7 facing thereto, the lens holding member 5 remains parallel to the fixing member 7 in a reliably manner, which reliably prevents the optical axis z from being inclined when the lens body 3 is moved along the optical axis z.

2. Second Embodiment

Lens Module Including Shaped Displacement Device

Figure 6A:
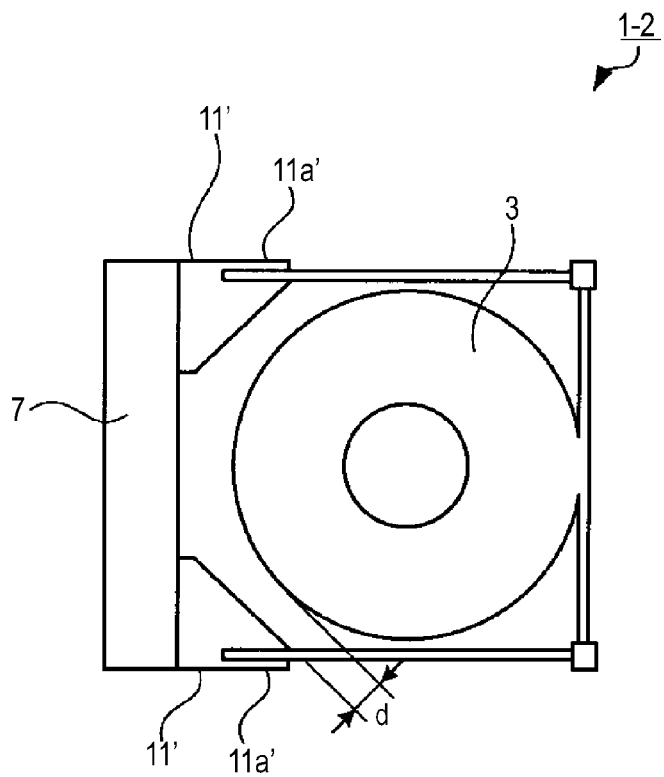
FIGS. 6A and 6B are plan views for describing the configuration of a lens module according to a second embodiment.
Figure 6B:
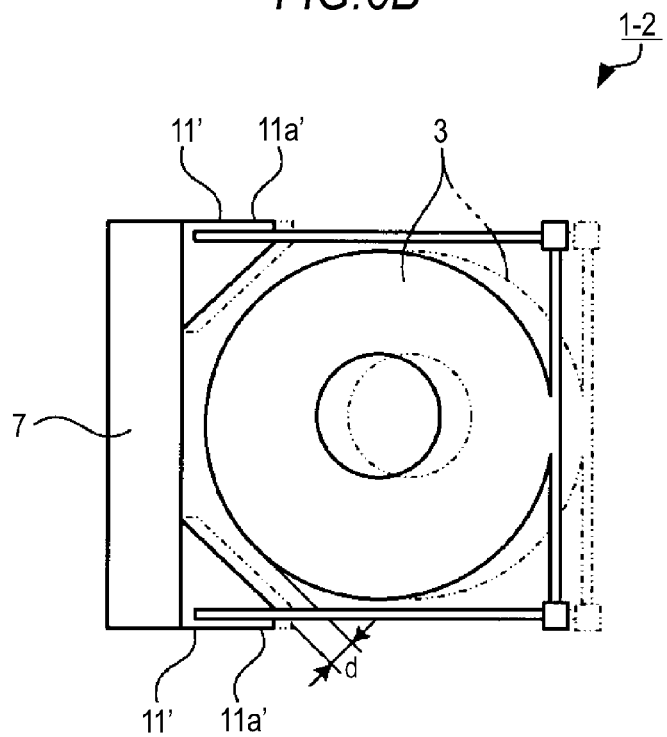

FIGS. 6A and 6B are plan views for describing the configuration of a lens module according to a second embodiment viewed from the side where the lens body 3 is present. The configuration of the lens module according to the second embodiment and driving operation thereof will be described below with reference to FIGS. 6A and 6B. The same components as those of the lens module described in the first embodiment have the same reference characters, and no redundant description will be made.

[Configuration of Lens Module According to Second Embodiment]

A lens module 1-2 according to the second embodiment shown in FIGS. 6A and 6B only differs from the lens module according to the first embodiment in terms of the shape of each displacement device 11' in a plan view, and the other components of the lens module 1-2 are the same as those of the lens module 1-1. That is, each of the displacement devices 11' is shaped in a plan view in accordance with the shape of the lens body 3. In other words, each of the displacement devices 11', which are disposed on opposite sides of the lens body 3 and fixed to the fixing member 7, has a portion facing the lens body 3 and truncated therealong.

The portion of each of the displacement devices 11' that is truncated along the lens body 3 does not necessarily have the linear shape shown in FIGS. 6A and 6B but may have an arcuate or stepped shape. Each of the displacement devices 11' is also so shaped that the width is maximized at the end facing the fixing member 7 and decreases with distance from the fixing member 7 toward a free end 11a'. It is important that a gap d is created between each of the displacement devices 11' and the lens body 3 even when a voltage is applied to the displacement devices 11' and the resultant curvature of the displacement devices 11' moves the lens body 3 toward the fixing member 7, as shown in FIG. 6B.

[Drive Operation of Lens Module According to Second Embodiment]

The thus configured lens module 1-2 is driven in the same manner as the lens module according to first embodiment.

[Advantageous Effects Provided by Lens Module According to Second Embodiment]

In the lens module 1-2 according to the second embodiment described above, the shape of each of the displacement devices 11' in a plan view is truncated along the lens body 3. The truncated displacement devices 11' allow the distance between the lens body 3 and the fixing member 7 to be smaller than that in the lens module according to the first embodiment, whereby the size of the lens module 1-2 can be further reduced. Since the area of each of the displacement devices 11' is also reduced, the yield (number of products) of EAP sheets (that is, polymer actuator devices) per sheet can be further significantly increased, resulting in further cost reduction.

The thrust force that results from the curvature of the displacement devices 11' and moves the lens body 3 depends on the width of the portion of each of the displacement devices 11' to which a voltage is applied, that is, the width of the portion of the fixing member 7 that holds each of the displacement devices 11'. The thrust force can therefore be large enough in the second embodiment, in which each of the displacement devices 11' has the tapered shape toward the free end 11a' in a plan view.

3. Third Embodiment

Lens Module Using Elastic Wire

Figure 7:
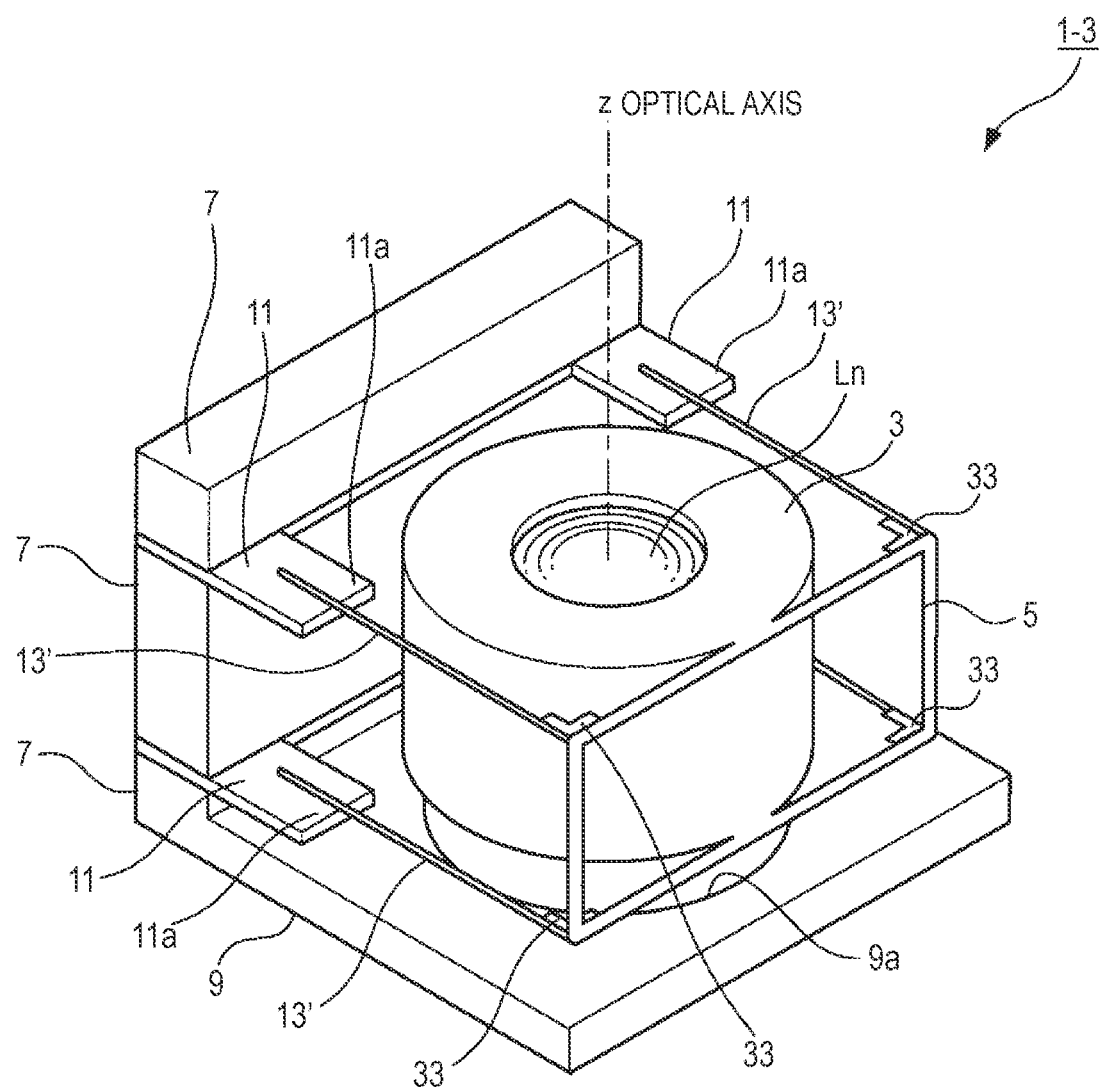
FIG. 7 is a perspective view for describing the configuration of a lens module according to a third embodiment.
Figure 8A:
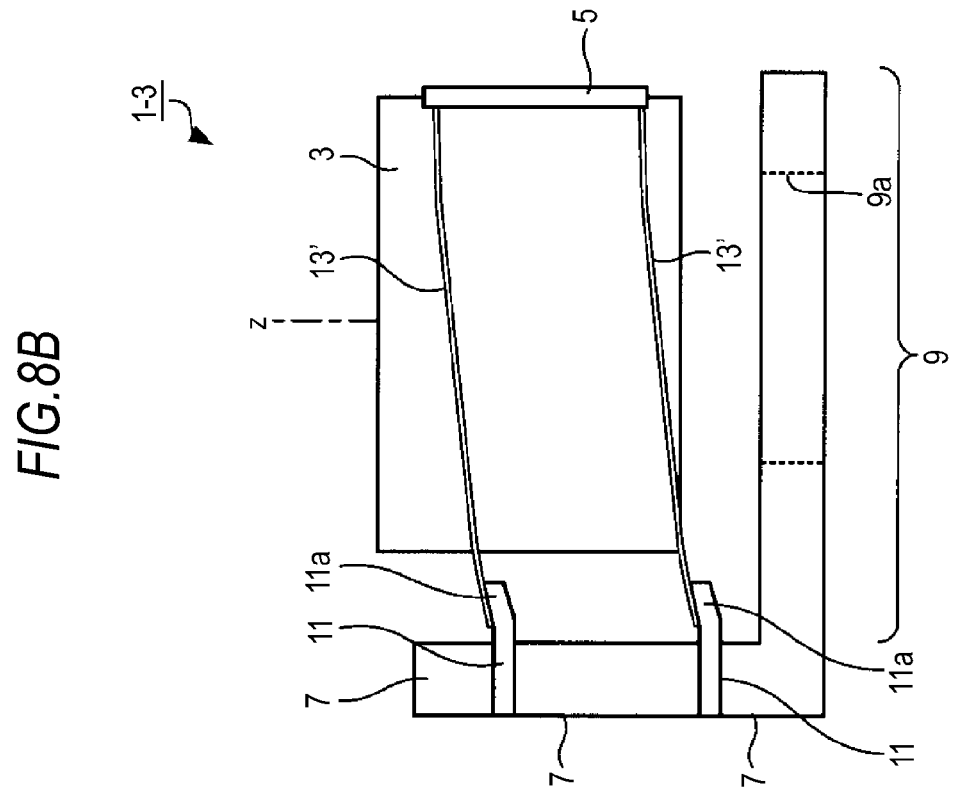
FIGS. 8A and 8B are side views for describing the configuration of the lens module according to the third embodiment and drive operation thereof.
Figure 8B:
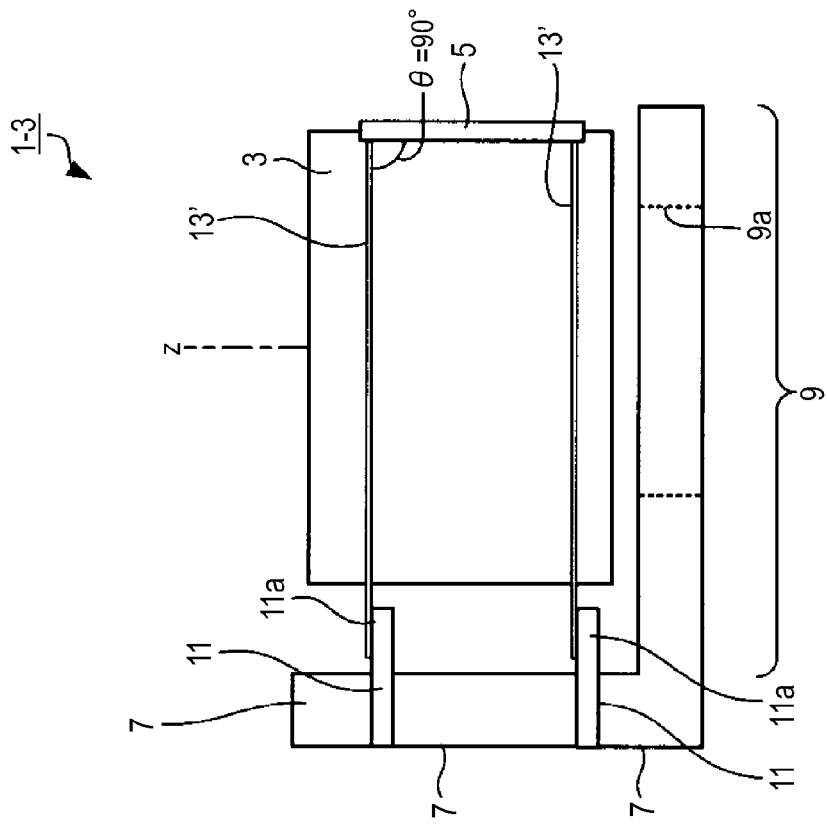

FIG. 7 is a perspective view for describing the configuration of a lens module according to a third embodiment. FIGS. 8A and 8B are side views for describing the configuration of the lens module according to the third embodiment and drive operation thereof. The configuration of the lens module according to the third embodiment and the driving operation thereof will be described below with reference to FIGS. 7, 8A, and 8B. The same components as those of the lens module described in the first embodiment have the same reference characters, and no redundant description will be made.

[Configuration of Lens Module According to Third Embodiment]

A lens module 1-3 shown in FIGS. 7, 8A, and 8B only differs from the lens module according to the first embodiment in that four displacement devices 11 are provided at two different heights along the optical axis z and an elastic wire is used as each drive support member 13', and the other components of the lens module 1-3 are the same as those of the lens module 1-1.

<Displacement Device 11>

Each of the four displacement devices 11 is the same as any of the displacement devices in the first embodiment. Two of the four at one height and the other two at another height along the optical axis z are fixed to the fixing member 7 on opposite sides of the sidewall of the lens body 3. The fixing member 7 is formed, for example, of three fixing portions stacked along the optical axis z, and one end of each of the displacement devices 11 is sandwiched between the corresponding fixing portions. The portions of the fixing member 7 that sandwich the displacement devices 11 also work as terminals through which a voltage is applied to the displacement devices 11.

The four displacement devices 11 have the same configuration and are fixed to the fixing member 7 in the same manner. Each of the four displacement devices 11 may be shaped in a plan view in accordance with the shape of the lens body 3, as described in the second embodiment.

<Drive Support Member 13'>

The drive support members 13' are so disposed that they run between the lens holding member 5 and the displacement devices 11 on opposite sides of the lens body 3. Each of the drive support members 13' is made of a flexible material having a certain degree of rigidity and formed of an elastic wire. An elastic wire produces a restoring force that brings its bent state back into its linear state.

Each of the drive support members 13' has one end fixed to the free end 11a of the corresponding displacement device 11 and the other end fixed to the lens holding member 5. In this state, the two drive support members 13' disposed at the same height along the optical axis z are kept parallel to each other.

The drive support members 13' have the same length, produce the same magnitude of restoring force, and are fixed to the respective displacement devices 11 in the same manner. When no force acts on the lens body 3 in an initial state, the drive support members 13' remain linear, and the interior angle θ between the lens holding member 5 and each of the drive support members 13' is kept at 90°, as shown in the side view of FIG. 8A. When a force acts on the lens holding member 5 and the lens body 3, the drive support members 13' attempt to return to the initial state.

The manner in which the drive support members 13' are fixed to the displacement devices 11 is the same as the manner in which the drive support members are fixed to the displacement devices 11 in the first embodiment. On the other hand, torsion prevention members 33 that allow the drive support members 13' to be curved only in planes parallel to the optical axis z are provided at portions where the drive support members 13' are fixed to the lens holding member 5. Each of the torsion prevention members 33 is, for example, an L-shaped elastic hinge.

[Drive Operation of Lens Module According to Third Embodiment]

The drive operation of the lens module 1-3A will next be described. First, when no voltage is applied to the displacement devices 11, the displacement devices 11 are not curved but remain flat, as shown in FIGS. 7 and 8A. The four drive support members 13', each of which is formed of an elastic wire, remain linear, and the lens body 3 is kept in an initial position.

On the other hand, when a voltage is applied to the displacement devices 11 and the displacement devices 11 are curved in the direction away from the mount 9, the drive support members 13' fixed to the free ends 11a of the displacement devices 11 pivot about the displacement devices 11 in the direction away from the mount 9, as shown in FIG. 8B. The lens holding member 5 fixed to the drive support members 13' are therefore lifted in the direction away from the mount 9. In this process, since the same displacement devices 11 and the same drive support members 13' connect the lens holding member 5 to the fixing member 7, the lens body 3 is lifted along the optical axis z with no inclination thereof while the lens holding member 5 remains parallel to the fixing member 7. In particular, the torsion prevention members 33 are provided at the portions where the drive support members 13' are connected to the lens holding member 5, and the drive support members 13' are curved only in planes parallel to the optical axis z, whereby the lens holding member 5 reliably remains parallel to the fixing member 7, and the lens body 3 is lifted along the optical axis z with no inclination thereof, that is, with no tilt thereof.

Further, when the voltage application to the displacement devices 11 is terminated in this state, the displacement devices 11 return from the curved state to the flat state, whereby the drive support members 13' return to the linear state and bring the lens body 3 back to the position immediately above the mount 9 with no inclination of the optical axis z, as shown in FIG. 8A.

In the drive operation described above, the travel of the lens body 3 along the optical axis z depends on the amount of curvature of the displacement devices 11, that is, is controlled by the magnitude of the voltage applied to the displacement devices 11. Further, the direction of the curvature of the displacement devices 11 is controlled by the state of the voltage application to the electrodes that form the displacement devices 11, as described in association with the configuration of the displacement devices 11. For example, to move the lens body 3 toward the mount 9, the state of the voltage application to the electrodes that form the displacement devices 11 may be reversed from the state of the voltage application in the drive operation described above.

[Advantageous Effects Provided by Lens Module According to Third Embodiment]

In the lens module 1-3 according to the third embodiment described above, the displacement of the free ends 11a of the displacement devices 11 fixed to the fixing member 7 also produces pivotal motion of the drive support members 13' having ends on one side that are fixed to the free ends 11a. The same advantageous effects provided in the first and second embodiments are therefore provided.

The third embodiment has been described with reference to the configuration in which four displacement devices 11 are provided at two different heights on opposite sides of the lens body 3. The lens module 1-3 according to the third embodiment may alternatively be so configured that the drive support members 13' may be fixed between the lens holding member 5 and the displacement devices 11 on opposite sides of the lens body 3, and that support members may be so disposed that they run between the lens holding member 5 and the fixing member 7 also on opposite sides of the lens body 3 at a height different from that of the drive support members 13' with no interposed displacement devices, as in the first embodiment. In this case, the support members are made of the same material as that of the drive support members 13'. The number of displacement devices 11 can be thus reduced, resulting in cost reduction.

Further, in the third embodiment, each of the drive support members 13' is formed of an elastic wire. Each of the drive support members 13' may alternatively be made of a flexible material having a certain degree of rigidity and capable of producing a restoring force that brings its bent state back into its linear state. The elastic wire may therefore be replaced with a flat-plate-shaped drive support member 13' that is thin along the optical axis z of the lens body 3. A flat-plate-shaped drive support member 13' of this type has flexibility only in the direction in which the plate thickness is small, that is, in the direction parallel to the optical axis z. Using a flat-plate-shaped drive support member 13' eliminates the need for the torsion prevention members 33 provided at the portions where the drive support members 13' are connected to the lens holding member 5, whereby the number of parts can be reduced.

4. Fourth Embodiment

Lens Module Including Lens Body Having Cubic Shape

Figure 9:
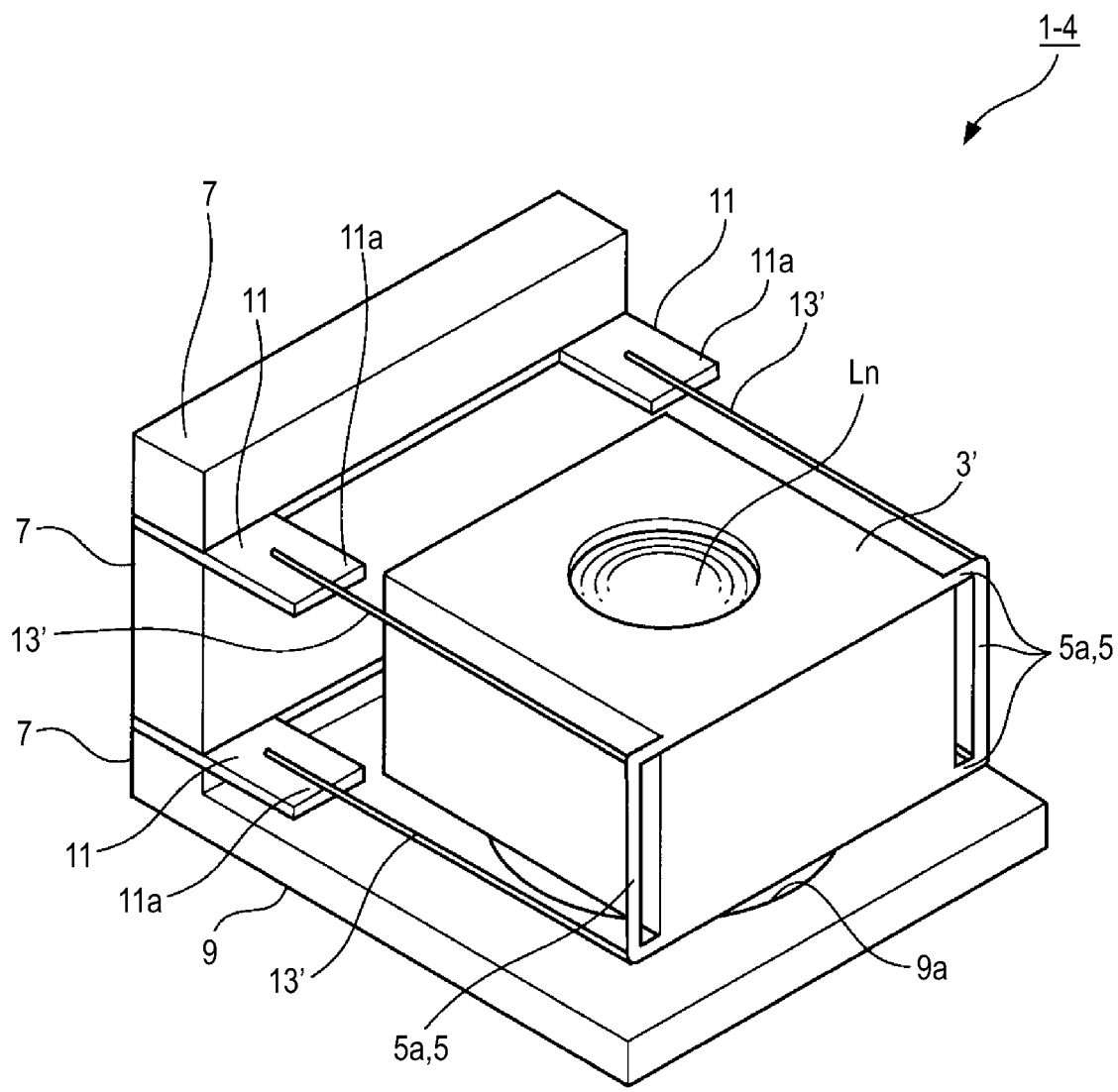
FIG. 9 is a perspective view for describing the configuration of a lens module according to a fourth embodiment.

FIG. 9 is a perspective view for describing the configuration of a lens module according to a fourth embodiment. A lens module 1-4 according to the fourth embodiment is a variation of the lens module according to the third embodiment, and the same components as those of the lens module described in the third embodiment have the same reference characters, and no redundant description will be made.

[Configuration of Lens Module According to Fourth Embodiment]

The lens module 1-4 shown in FIG. 9 only differs from the lens module according to the third embodiment in that a lens body 3' is a barrel-shaped lens body having a box-like shape, such as what is called a reflowable lens, and the other components in the fourth embodiment are the same as those in the third embodiment. A reflowable lens used herein is a heat-resistant lens that withstands a soldering reflow process.

In the thus configured lens module 1-4, four wires 5a form the lens holding member 5, and two of the four wires 5a hold a wide area of the sidewall of the lens body 3' having a box-like shape.

Four displacement devices 11 used in the lens module 1-4 according to the fourth embodiment do not necessarily have a rectangular shape in a plan view as shown in FIG. 9 but may be shaped in accordance with the shape of the lens body 3' as described in the second embodiment. In this case, each of the displacement devices has a portion facing the lens body 3' and truncated in accordance with the shape of the lens body 3' into a stepped shape.

[Drive Operation of Lens Module According to Fourth Embodiment]

The thus configured lens module 1-4 is driven in the same manner as the lens module according to the third embodiment.

[Advantageous Effects Provided by Lens Module According to Fourth Embodiment]

The lens module 1-4 according to the fourth embodiment described above also provides the same advantageous effects provided in the first and third embodiments. In particular, since using the lens body 3' having a box-like shape in the fourth embodiment allows the drive support members 13' to be disposed along the outer shape of the lens body 3', the outer size of the lens module 1-4 can be reduced more effectively.

The lens module 1-4 according to the fourth embodiment can be combined with the lens module according to the first embodiment. For example, the lens body in the lens module described in the first embodiment may have a box-like shape. The thus configured lens module is driven in the same manner as the lens module according to the first embodiment.

5. Fifth Embodiment

Imaging Apparatus

Figure 10:
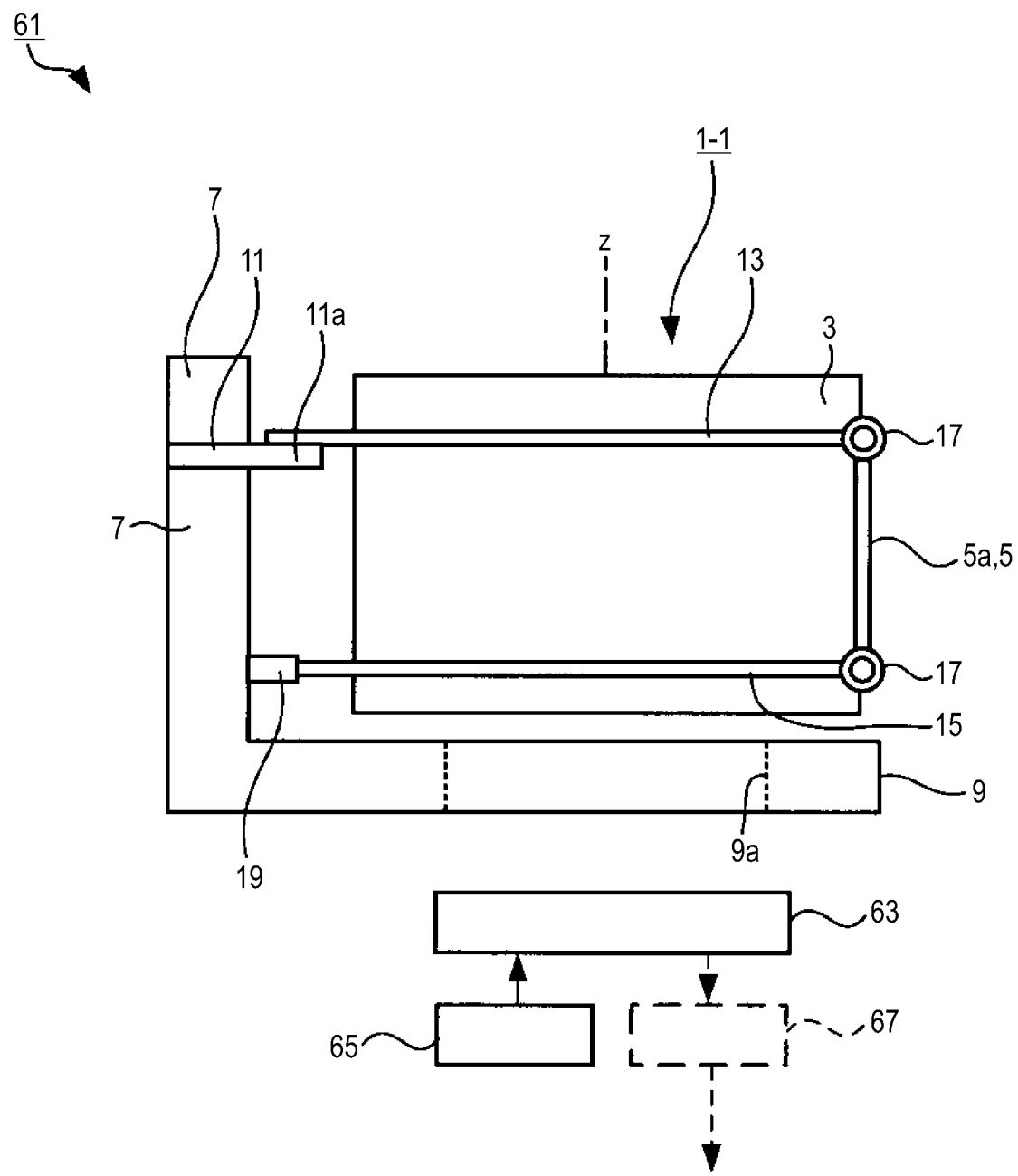
FIG. 10 is a configuration diagram of an imaging apparatus according to a fifth embodiment.

The configuration of an imaging apparatus according an embodiment of the present technology will be described as a fifth embodiment. FIG. 10 is a configuration diagram of an imaging apparatus 61 using one of the lens modules to which the present technology is applied. The imaging apparatus 61 shown in FIG. 10 uses one of the lens modules according to the embodiments of the present technology described above (lens module 1-1 according to first embodiment is used as representative one in present description) as an autofocus module. The imaging apparatus 61 includes not only the lens module 1-1 but also a solid-state imaging device 63 and a drive circuit 65, and a signal processing circuit 67 as necessary.

The solid-state imaging device 63 acquires an imaged signal produced by the lens body 3, which forms the lens module 1-1. The solid-state imaging device 63 includes an image sensor formed of a charge coupled device (CCD), a CMOS (complementary metal oxide semiconductor) device, or any other suitable imaging device. The solid-state imaging device 63 is aligned with the lens module 1-1 along the optical axis z thereof. More specifically, the solid-state imaging device 63 is so aligned with the lens module 1-1 that the optical axis z of the lens body 3 intersects a light reception surface of the image sensor in the solid-state imaging device 63 and is perpendicular to the light receiving surface. For example, when the solid-state imaging device 63 is disposed on the side where the mount 9 is present, the solid-state imaging device 63 is so disposed that the light reception surface of the image sensor faces the opening 9a provided through the mount 9.

The lens module 1-1 and the solid-state imaging device 63 are fixed in a housing (not shown) of the imaging apparatus.

The drive circuit 65 drives the solid-state imaging device 63 and controls accumulation and readout of signal charge produced in a photoelectric conversion process in the image sensor. The drive circuit 65 may be provided as a circuit external to the solid-state imaging device 63 or may be incorporated as an internal circuit in the solid-state imaging device 63.

The signal processing circuit 67 processes a video signal read by the drive circuit 65 and outputs the video signal having undergone signal processing as necessary to a memory or any other storage medium and a monitor.

In the thus configured imaging apparatus 61, the lens body 3 in the lens module 1-1 focuses image light (incident light) from a subject on the light reception surface of the solid-state imaging device 63. In this process, the drive circuit 65 produces a video signal by driving the solid-state imaging device 63 to accumulate signal charge therein for a fixed period and reading the signal charge therefrom.

The thus configured imaging apparatus 61 using the lens module 1-1 according to one embodiment of the present technology as an autofocus module is thin and compact. As a result, the imaging apparatus 61, even when it needs to provide high image quality and uses a large-aperture lens, can still be thin and compact.

6. Sixth Embodiment

Electronic System

An example of the configuration of an electronic system to which the present technology is applied will be described as a sixth embodiment. FIGS. 11A and 11B are perspective views showing a schematic configuration of a mobile phone with imaging capability (mobile phone 100) as an example of the electronic system.

The mobile phone 100 has two housings 101A and 101B foldably connected to each other with a hinge mechanism (not shown).

One surface of the housing 101A has a variety of operation keys 102 arranged thereon and a microphone 103 disposed in a lower end portion, as shown in FIG. 11A. A user operates each of the operation keys 102 in a predetermined manner to input information. Voice of the user, for example, during a call is inputted through the microphone 103.

One surface of the housing 101B has a display section 104 formed, for example, of a liquid crystal panel disposed thereon and a loudspeaker 105 disposed in an upper end portion, as shown in FIG. 11A. The display section 104 displays a variety of pieces of information, such as a radio wave reception status, the amount of remaining battery power, the telephone number of the other party, contents registered in a telephone book (telephone numbers, names, and other information on other registered parties), outgoing call histories, and incoming call histories. The loudspeaker 105 outputs audio and other sounds from the other party, for example, during a call.

The other surface of the housing 101A has a cover glass plate 106 disposed therein and the imaging apparatus 61 described above disposed in a position corresponding to the cover glass plate 106 in the housing 101A, as shown in FIG. 11B. The imaging apparatus 61 is so fixed in the housing 101A that the lens module 1-1 described in the first embodiment is, for example, disposed on the object side (side where cover glass plate 106 is present) and the solid-state imaging device 63 is disposed on the image side (in deeper position than lens module 1-1 in housing 101A).

The mobile phone 100 is provided with the signal processing circuit (67), which performs a variety of types of signal processing based on signal charge read from the solid-state imaging device 63 in the imaging apparatus 61. A video signal processed by the signal processing circuit (67) is stored in a built-in memory or any other storage medium or outputted to the display section 104.

The thus configured mobile phone 100, which accommodates the imaging apparatus 61 including, for example, the lens module 1-1 described in the first embodiment, can be compact. In particular, the thickness of the mobile phone 100 along the optical axis of the lens can be reduced.

The present technology can also be configured as follows.

(1) A lens module including
a lens body,
a lens holding member that holds the lens body by holding a sidewall thereof extending along an optical axis of the lens body,
a fixing member disposed on the opposite side of the lens body to the lens holding member,
flat-plate-shaped displacement devices disposed on opposite sides of the sidewall of the lens body, each of the displacement devices having one end fixed to the fixing member and the other end being a free end and protruding toward the lens holding member, each of the displacement devices being curved along surfaces thereof when a voltage is applied thereto to cause the free end to be displaced along the optical axis, and
a plurality of drive support members disposed on opposite sides of the sidewall of the lens body, each of the drive support members having one end fixed to the free end of the corresponding displacement device and the other end pivotally fixed to the lens holding member.

(2) The lens module described in (1),
wherein each of the displacement devices is a polymer actuator device.

(3) The lens module described in (1) or (2),
wherein each of the displacement devices has a portion facing the lens body and shaped in accordance with the shape of the lens body in a plan view.

(4) The lens module described in any of (1) to (3),
wherein support members similar to the drive support members are so provided that the support members run between the lens holding member and the fixing member on opposite sides of the sidewall of the lens body, each of the support members pivotally moving in a plane parallel to the optical axis.

(5) The lens module described in any of (1) to (4),
wherein each of the drive support members is formed of a rigid link bar, and a connecting member that pivotally connects each of the drive support members to the lens holding member is provided between the drive support member and the lens holding member.

(6) The lens module described in any of (1) to (4), wherein each of the drive support members is formed of an elastic wire.

(7) An imaging apparatus including a lens body, a lens holding member that holds the lens body by holding a sidewall thereof extending along an optical axis of the lens body, a fixing member disposed on the opposite side of the lens body to the lens holding member, flat-plate-shaped displacement devices disposed on opposite sides of the sidewall of the lens body, each of the displacement devices having one end fixed to the fixing member and the other end being a free end and protruding toward the lens holding member, each of the displacement devices being curved along surfaces thereof when a voltage is applied thereto to cause the free end to be displaced along the optical axis, a plurality of drive support members disposed on opposite sides of the sidewall of the lens body, each of the drive support members having one end fixed to the free end of the corresponding displacement device and the other end pivotally fixed to the lens holding member, and a solid-state imaging device disposed in a position where the lens body forms an image.

(8) An electronic system including a lens body, a lens holding member that holds the lens body by holding a sidewall thereof extending along an optical axis of the lens body, a fixing member disposed on the opposite side of the lens body to the lens holding member, flat-plate-shaped displacement devices disposed on opposite sides of the sidewall of the lens body, each of the displacement devices having one end fixed to the fixing member and the other end being a free end and protruding toward the lens holding member, each of the displacement devices being curved along surfaces thereof when a voltage is applied thereto to cause the free end to be displaced along the optical axis, a plurality of drive support members disposed on opposite sides of the sidewall of the lens body, each of the drive support members having one end fixed to the free end of the corresponding displacement device and the other end pivotally fixed to the lens holding member, a solid-state imaging device disposed in a position where the lens body forms an image, and a signal processing circuit that processes an output signal from the solid-state imaging device.

(9) A method for driving a lens module, the method including applying a voltage to a flat-plate-shaped displacement device having one end fixed to a fixing member so that the displacement device is curved along surfaces thereof and a free end of the displacement device is displaced, allowing the curvature of the displacement device to cause a drive support member having one end fixed to the free end of the displacement device to pivot in the direction in which the displacement device is curved, allowing the pivotal motion of the drive support member to displace a lens holding member fixed to the other end of the drive support member and facing the fixing member in parallel thereto in such a way that the lens holding member remains parallel to the fixing member, and allowing the displacement of the lens holding member to move a lens body held by the lens holding member along an optical axis extending in the direction in which the displacement device is curved.

The present disclosure contains subject matter related to that disclosed in Japanese Priority Patent Application JP 2011-106311 filed in the Japan Patent Office on May 11, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lens module comprising:
a lens body;
a lens holding member that holds the lens body by holding a sidewall thereof extending along an optical axis of the lens body;
a fixing member disposed on the opposite side of the lens body to the lens holding member;
flat-plate-shaped displacement devices disposed on opposite sides of the sidewall of the lens body, each of the displacement devices having one end fixed to the fixing member and the other end being a free end and protruding toward the lens holding member, each of the displacement devices being curved along surfaces thereof when a voltage is applied thereto to cause the free end to be displaced along the optical axis; and
a plurality of drive support members disposed on opposite sides of the sidewall of the lens body, each of the drive support members having one end fixed to the free end of the corresponding displacement device and the other end pivotally fixed to the lens holding member.

2. The lens module according to claim 1,
wherein each of the displacement devices is a polymer actuator device.

3. The lens module according to claim 1,
wherein each of the displacement devices has a portion facing the lens body and shaped in accordance with the shape of the lens body in a plan view.

4. The lens module according to claim 1,
wherein support members similar to the drive support members are so provided that the support members run between the lens holding member and the fixing member on opposite sides of the sidewall of the lens body, each of the support members pivotally moving in a plane parallel to the optical axis.

5. The lens module according to claim 1,
wherein each of the drive support members is formed of a rigid link bar, and
a connecting member that pivotally connects each of the drive support members to the lens holding member is provided between the drive support member and the lens holding member.

6. The lens module according to claim 1,
wherein each of the drive support members is formed of an elastic wire.

7. An imaging apparatus comprising:
a lens body;
a lens holding member that holds the lens body by holding a sidewall thereof extending along an optical axis of the lens body;

a fixing member disposed on the opposite side of the lens body to the lens holding member;

flat-plate-shaped displacement devices disposed on opposite sides of the sidewall of the lens body, each of the displacement devices having one end fixed to the fixing member and the other end being a free end and protruding toward the lens holding member, each of the displacement devices being curved along surfaces thereof when a voltage is applied thereto to cause the free end to be displaced along the optical axis;

a plurality of drive support members disposed on opposite sides of the sidewall of the lens body, each of the drive support members having one end fixed to the free end of the corresponding displacement device and the other end pivotally fixed to the lens holding member; and a solid-state imaging device disposed in a position where the lens body forms an image.

8. An electronic system comprising:

a lens body;

a lens holding member that holds the lens body by holding a sidewall thereof extending along an optical axis of the lens body;

a fixing member disposed on the opposite side of the lens body to the lens holding member;

flat-plate-shaped displacement devices disposed on opposite sides of the sidewall of the lens body, each of the displacement devices having one end fixed to the fixing member and the other end being a free end and protruding toward the lens holding member, each of the displacement devices being curved along surfaces thereof when a voltage is applied thereto to cause the free end to be displaced along the optical axis;

a plurality of drive support members disposed on opposite sides of the sidewall of the lens body, each of the drive support members having one end fixed to the free end of the corresponding displacement device and the other end pivotally fixed to the lens holding member;

a solid-state imaging device disposed in a position where the lens body forms an image; and a signal processing circuit that processes an output signal from the solid-state imaging device.

9. A method for driving a lens module, the method comprising:

applying a voltage to a flat-plate-shaped displacement device having one end fixed to a fixing member so that the displacement device is curved along surfaces thereof and a free end of the displacement device is displaced;

allowing the curvature of the displacement device to cause a drive support member having one end fixed to the free end of the displacement device to pivot in the direction in which the displacement device is curved;

allowing the pivotal motion of the drive support member to displace a lens holding member fixed to the other end of the drive support member and facing the fixing member in parallel thereto in such a way that the lens holding member remains parallel to the fixing member; and allowing the displacement of the lens holding member to move a lens body held by the lens holding member along an optical axis extending in the direction in which the displacement device is curved.

\* \* \* \* \*